United States Patent
Harma et al.

(10) Patent No.: US 8,935,635 B2
(45) Date of Patent: Jan. 13, 2015

(54) METHOD AND DEVICE FOR ENABLING SELECTION OF AN ITEM FROM A PLURALITY OF ITEMS

(75) Inventors: Aki Sakari Harma, Eindhoven (NL); Julien Laurent Bergere, Brussels (BE)

(73) Assignee: Koninklijke Philips N.V., Eindhoven (NL)

( * ) Notice: Subject to any disclaimer, the term of this patent is extended or adjusted under 35 U.S.C. 154(b) by 688 days.

(21) Appl. No.: 12/919,809

(22) PCT Filed: Mar. 10, 2009

(86) PCT No.: PCT/IB2009/050987
§ 371 (c)(1),
(2), (4) Date: Aug. 27, 2010

(87) PCT Pub. No.: WO2009/113021
PCT Pub. Date: Sep. 17, 2009

(65) Prior Publication Data
US 2011/0010671 A1     Jan. 13, 2011

(30) Foreign Application Priority Data
Mar. 13, 2008 (EP) ..................................... 08152703

(51) Int. Cl.
*G06F 3/00* (2006.01)
*G11B 27/10* (2006.01)
*G11B 27/34* (2006.01)
(52) U.S. Cl.
CPC .............. *G11B 27/105* (2013.01); *G11B 27/34* (2013.01)
USPC ............ 715/828; 715/729; 715/829; 715/835

(58) Field of Classification Search
USPC .......................... 715/834, 828, 829, 729, 835
See application file for complete search history.

(56) References Cited

U.S. PATENT DOCUMENTS

| | | | |
|---|---|---|---|
| 6,054,989 A | 4/2000 | Robertson et al. |
| 6,337,537 B1 | 1/2002 | Bourgade et al. |
| 6,894,703 B2 | 5/2005 | Vernier et al. |

(Continued)

FOREIGN PATENT DOCUMENTS

JP     2000236600 A     8/2000

OTHER PUBLICATIONS

Eisert et al:"Creation and Scene Composition for High-Resolution Panoramas"; Fraunhofer Institue for Telecommunications, Heinrich-Hertz-Institute Image Processing Department, Berlin, Germany, 8 Page Document.

(Continued)

*Primary Examiner* — Ryan Pitaro
(74) *Attorney, Agent, or Firm* — Jones Day

(57) ABSTRACT

The method of the invention enables selection of an item (21) from a plurality of items (21, 23, 25). The method comprises the steps of visually representing a selected item (21) and reproducing at least part of an audio segment representing the selected item (21). The method further comprises applying a visual spatial effect to the visual representation of the selected item (21) and applying a spatial audio effect corresponding to the visual spatial effect to the reproduction of the audio segment. The device of the invention comprises electronic circuitry which is operative to perform the method of the invention. The computer program product of the invention enables a programmable device to perform the method of the invention.

7 Claims, 2 Drawing Sheets

(56) References Cited

U.S. PATENT DOCUMENTS

| | | | |
|---|---|---|---|
| 7,103,841 B2* | 9/2006 | Ronkainen et al. | 715/727 |
| 7,216,305 B1 | 5/2007 | Jaeger | |
| 7,996,788 B2* | 8/2011 | Carmichael | 715/834 |
| 8,185,839 B2* | 5/2012 | Jalon et al. | 715/769 |
| 2006/0026529 A1 | 2/2006 | Paulsen et al. | |
| 2006/0265643 A1 | 11/2006 | Saft et al. | |
| 2007/0055947 A1 | 3/2007 | Ostojic et al. | |
| 2008/0046239 A1 | 2/2008 | Boo | |
| 2008/0086687 A1* | 4/2008 | Sakai et al. | 715/716 |
| 2009/0198359 A1* | 8/2009 | Chaudhri | 700/94 |
| 2009/0304359 A1* | 12/2009 | Lemay et al. | 386/96 |
| 2010/0306657 A1* | 12/2010 | Derbyshire et al. | 715/727 |

OTHER PUBLICATIONS

Harma et al: Spatial Track Transition Effects for Headphone Listening; Proceedings of the 10th International Conference on Digital Effects (DAFx-07), Bordeaux, France, Sep. 10-15, 2007, pp. DAFX1-DAFX-6.

Zhao et al: "Earpod: Eyes-Free Menu Selection Using Touch Input and Reactive Audio Feedback"; CHI 2007, 10 Page Document.

Pauws et al: "Programming and Enjoying Music With Your Eyes Closed"; CHI 2000 Conference Proceedings on Human Factors in Computing Systems, Apr. 2000, 8 Page Document.

* cited by examiner

METHOD AND DEVICE FOR ENABLING SELECTION OF AN ITEM FROM A PLURALITY OF ITEMS

FIELD OF THE INVENTION

The invention relates to a method of enabling selection of an item from a plurality of items, e.g. a music collection.

The invention further relates to a device for enabling selection of an item from a plurality of items, e.g. a music collection, the device comprising electronic circuitry.

The invention also relates to a computer program product enabling a programmable device to perform a method of enabling selection of an item from a plurality of items.

BACKGROUND OF THE INVENTION

A method of enabling selection of an item from a plurality of items is known, for example, from Apple iTunes. Apple iTunes offers an interface called CoverFlow which enables users to browse a collection of songs. The songs are represented by images of cover art arranged in the form of a wheel. A drawback of the CoverFlow interface is that it is mainly a visual interface and a user operating the interface needs to pay careful attention to a display.

SUMMARY OF THE INVENTION

It is a first object of the invention to provide a method of the type described in the opening paragraph, which does not require a user to always focus his attention on a display while selecting an item.

It is a second object of the invention to provide a device of the type described in the opening paragraph, which does not require a user to always focus his attention on a display while selecting an item.

According to the invention, the first object is realized in that the method comprises the steps of visually representing a selected item, reproducing at least part of an audio segment representing the selected item, applying a visual spatial effect to the visual representation of the selected item, and applying a spatial audio effect corresponding to the visual spatial effect to the reproduction of the audio segment. This allows a user to determine which items are being browsed through and which item is currently selected without continuously looking at a display, which is especially important in portable players, for example, when the player is in a pocket or when the player is used in a vehicle. The combination of auditory and visual information results in a powerful and intuitive user interface.

The item may be a song, an album or a play list, for example. The audio segment may be the item itself, e.g. a song, or a part of the item, e.g. a chorus of a song or the first 10 seconds of a song, for example. When the item is an album or a play list, the audio segment may be the first song of the album or play list, the title song of the album, the preferred song of the album or play list, or some other song selected by some other criterion or criteria. The audio segment may also be a synthesized melody, such as those used in MIDI files and certain ringtones.

In an embodiment of the method of the invention, the method further comprises the steps of selecting a further item instead of the selected item, visually representing the selected further item, and reproducing at least part of a further audio segment representing the selected further item upon said selection. By starting reproduction upon selection of an item, the required amount of user input is reduced.

The method may further comprise the steps of applying a further visual spatial effect to the visual representation of the selected further item and applying a further spatial audio effect corresponding to the further visual spatial effect to the reproduction of the further audio segment. Since the visual spatial effect would normally be applied to both the item and the further item, it would be most natural to apply the spatial audio effect to both the item and the further item as well.

Both the audio segment and the further audio segment may be simultaneously reproduced during at least a transition period. By reproducing both segments simultaneously, the visual spatial effects are most closely mimicked, because these are also applied simultaneously. Favourably, the audio segment can be faded out and the further audio segment can be faded in during the transition period. In addition to the audio segment and the further audio segment, other audio segments representing non-selected items may be reproduced simultaneously as well to indicate what other items are available for selection.

A user may be enabled to select the item by rotating a wheel of items. This approach used in Apple's CoverFlow has the advantage of being intuitive, yet simple.

A user may be enabled to select the item by navigating through items in a matrix. This approach is somewhat more complex, but enables fast navigation as a result of more dimensions being used.

Items along at least one of the dimensions of the matrix may be ordered according to an attribute of the items. This makes it clearer for the user in which direction he should navigate in order to find a specific item. For example, items could be organized by meaningful qualitative attributes such that one dimension (e.g. south-north) could represent harmonic and quiet music to rough and aggressive genres and the other direction (east-west) could represent increasing tempo.

The visual spatial effect and the spatial audio effect may be applied in a three-dimensional space. A three-dimensional visual space can accommodate relatively many items on a display with limited size and three-dimensional audio effects can easily be created using a positional three-dimensional sound processing algorithm, such as the one described in "Aki Härmä and Steven van de Par, Spatial track transition effects for headphone listening, Proc. 10th DAFx, Bordeaux, France, 2007".

According to the invention, the second object is realized in that the electronic circuitry of the device is operative to visually represent a selected item, reproduce at least part of an audio segment representing the selected item, apply a visual spatial effect to the visual representation of the selected item, and apply a spatial audio effect corresponding to the visual spatial effect to the reproduction of the audio segment.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numerals.

DETAILED DESCRIPTION OF THE EMBODIMENTS

Figure 1:
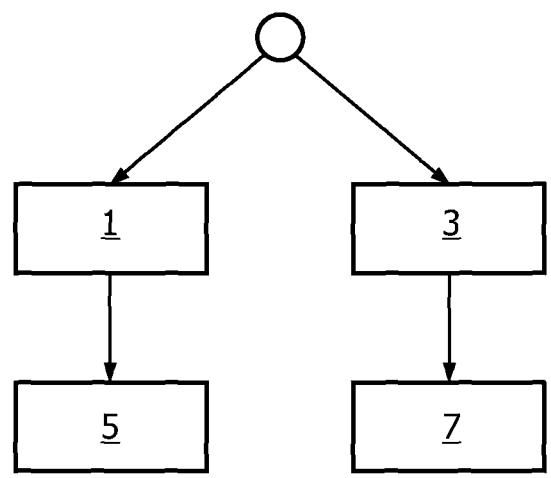
FIG. 1 is a flow diagram of the method of the invention.

The method comprises four steps, see FIG. 1. A step 1 comprises visually representing a selected item. A step 3 comprises reproducing at least part of an audio segment representing the selected item. A step 5 comprises applying a visual spatial effect to the visual representation of the selected item. A step 7 comprises applying a spatial audio effect corresponding to the visual spatial effect to the reproduction of the audio segment.

Figure 2:
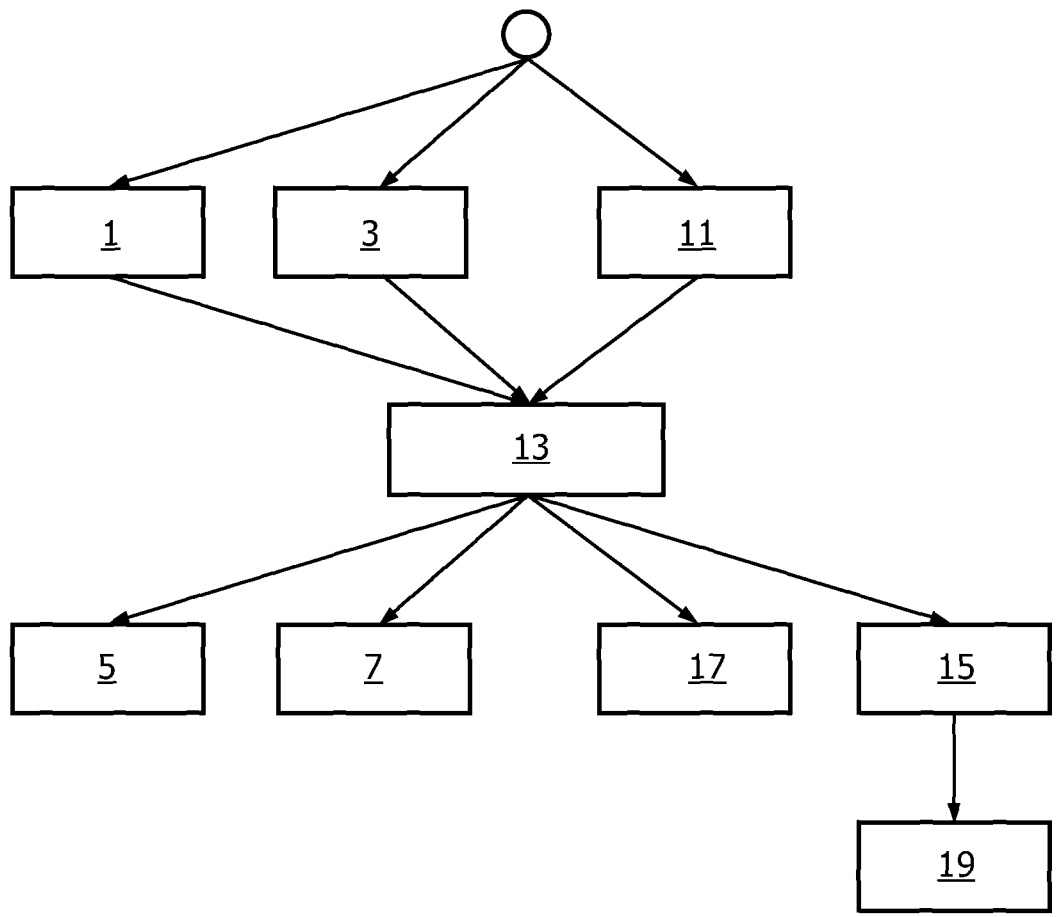
FIG. 2 is a flow diagram of a first embodiment of the method of the invention.

Steps 5 and 7 may be performed in response to a step 13 in which a further item is selected instead of the currently selected item, see FIG. 2. In response to the further item being selected in step 13, furthermore, at least part of a further audio segment representing the selected further item may be reproduced in step 15. In the embodiment of the method depicted in FIG. 2, the selected further item was already visually represented in step 11 before it was selected in step 13. Alternatively, the selected further item could only be visually represented after it had been selected and even only after the reproduction of the further audio segment had already started. A further visual spatial effect may be applied to the visual representation of the selected further item in step 17 and a further spatial audio effect corresponding to the further visual spatial effect may be applied to the reproduction of the further audio segment in step 19.

Figure 3:
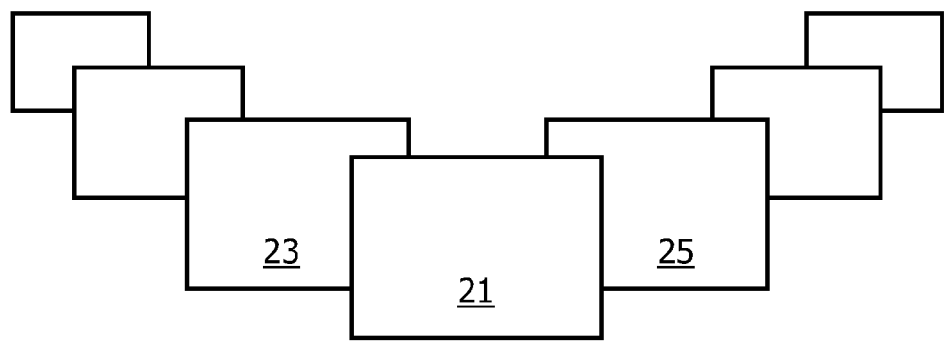
FIG. 3 is a schematic representation of a user interface generated with a second embodiment of the method of the invention.

The visual representations of the items may be arranged in the form of a wheel (which may only be partly visible). An example of such a user interface is shown in FIG. 3. The items may be songs and the visual representations may be images of CD covers, for example. In an embodiment of the method, a currently selected song 21 has automatically started playing upon being selected. A user may be able to scroll the wheel (sometimes also referred to as carousel) left or right, e.g. using cursor keys or a scroll wheel, in order to select another song 23 or 25. When another song 23 or 25 is selected, this other song 23 or 25 or a preview thereof may automatically start playing. When a user scrolls left or right and thus the visual representation of the currently selected song 21 moves to the left or right, a corresponding audio effect is applied to the reproduction of the currently selected song 21 or preview thereof, such that the user can hear that the currently selected song 21 is moving to the left or right. The reproduction of the currently selected song 21 or preview thereof may be slowly faded out to indicate that the other song 23 or 25 is in the process of being selected.

The visual representation of the other song 23 or 25 moves in the same direction as the song being replaced 21 to end up in the centre position. The other song 23 or 25 or a preview thereof may start playing as soon as its visual representation starts moving. A corresponding audio effect may be applied to the reproduction of the other song 23 or 25 or preview thereof, such that the user can hear that the other song 23 or 25 is moving to the left or right. The other song 23 or 25 or preview thereof may be slowly faded in until it ends up in the centre position and is reproduced at a normal volume. When a song has been selected, a user may be able to indicate, e.g. by pressing a button, that he wants to buy the song or add the song to a playlist, for example.

Figure 4:
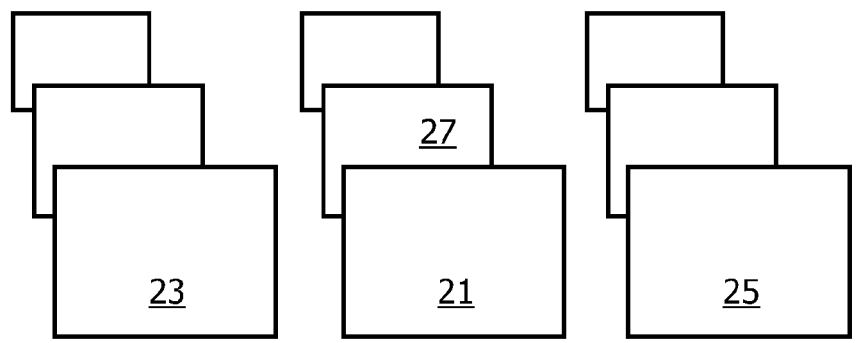
FIG. 4 is a schematic representation of a user interface generated with a third embodiment of the method of the invention.

Alternatively, the visual representations of the items may be arranged in a matrix. An example of such a user interface is shown in FIG. 4. Again, the items may be songs and the visual representations may be images of CD covers, for example. In an embodiment of the method, the user can use cursor keys to navigate through the songs, each cursor key press changing which song is selected. When a user presses the left cursor key, the view on the matrix shifts left, thereby selecting other song 23. When a user presses the right cursor key, the view on the matrix shifts right, thereby selecting other song 25. When a user presses the up cursor key, the view on the matrix shifts forward, thereby selecting other song 27. In the latter case, songs 21, 23 and 25 may no longer be visually represented after the shift in view. When the view shifts forward, corresponding audio effects may be applied to the reproduction of the currently selected song 21 and the other song 27 or previews thereof, such that the user can hear that the view is moving away from currently selected song 21 towards other song 27. For example, the reproduction of currently selected song 21 or preview thereof may be processed in such a way that the currently selected song 21 appears to the user to move to a position behind him.

Figure 5:
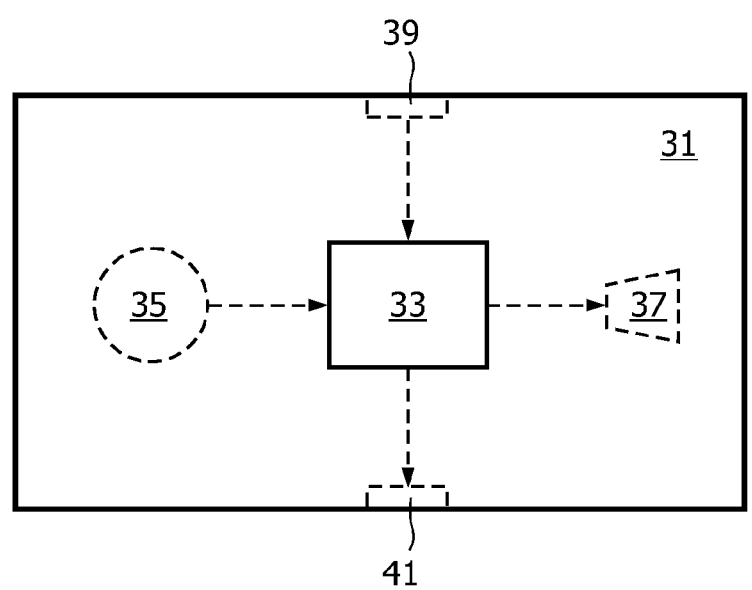
FIG. 5 is a block diagram of the device of the invention.

FIG. 5 shows the device 31 of the invention. The electronic device 31 comprises electronic circuitry 33. The electronic circuitry is operative to visually represent a selected item, reproduce at least part of an audio segment representing the selected item, apply a visual spatial effect to the visual representation of the selected item, and apply a spatial audio effect corresponding to the visual spatial effect to the reproduction of the audio segment.

The device 31 may be a stationary or a portable device. The device 31 may be a consumer device, e.g. a portable music player, a mobile phone, a TV or a PC, or a professional device. The electronic circuitry 33 may be a general-purpose or an application-specific processor. The electronic circuitry 33 may be capable of executing a computer program. The device 31 may further comprise a storage means 35, a reproduction means 37, an input 39 and/or an output 41.

The storage means 35 may comprise, for example, a hard disk, solid-state memory, an optical disc reader or a holographic storage means. The reproduction means 37 may comprise, for example, a display and/or a loud speaker. The input 39 and output 41 may comprise, for example, a network connector, e.g. a USB connecter or an Ethernet connector, an analog audio and/or video connector, such as a cinch connector or a SCART connector, or a digital audio and/or video connector, such as an HDMI or SPDIF connector. The input 39 and output 41 may comprise a wireless receiver and/or transmitter. The input 39 may comprise a broadcast receiver. The output 41 may be connected to headphones or to a home-cinema system, supporting 2-channel and/or multi-channel surround sound, for example.

While the invention has been described in connection with preferred embodiments, it will be understood that modifications thereof within the principles outlined above will be evident to those skilled in the art, and thus the invention is not limited to the preferred embodiments but is intended to encompass such modifications. The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

'Means', as will be apparent to a person skilled in the art, are meant to include any hardware (such as separate or integrated circuits or electronic elements) or software (such as programs or parts of programs) which perform in operation or are designed to perform a specified function, be it solely or in conjunction with other functions, be it in isolation or in co-operation with other elements. The invention can be implemented by means of hardware comprising several distinct elements, and by means of a suitably programmed computer.

'Software' is to be understood to mean any software product stored on a computer-readable medium, such as a floppy disk, downloadable via a network, such as the Internet, or marketable in any other manner.

The invention claimed is:

1. A method of enabling selection of an item from a plurality of items, the method comprising the steps of:
   visually representing a selected item at a center position among visual representations of the plurality of items arranged in one of a three-dimensional wheel and a three-dimensional matrix;
   reproducing at least part of an audio segment representing the selected item;
   applying a visual spatial effect to the visual representation of the selected item; and
   applying a spatial audio effect corresponding to the visual spatial effect to the reproduction of the audio segment, further comprising:
   selecting a further item instead of the selected item;
   visually representing the selected further item at the center position; and
   reproducing at least part of a further audio segment representing the selected further item upon said selection; and
   applying a further visual spatial effect to the visual representation of the selected further item; and
   applying a further spatial audio effect corresponding to the further visual spatial effect to the reproduction of the further audio segment, wherein (i) both (i)(a) the audio segment and (i)(b) the further audio segment are simultaneously reproduced and (ii) respective corresponding visual spatial effects and spatial audio effects for both (ii)(a) the selected item and (ii)(b) the further selected item are simultaneously applied, during at least a transition period such that (iii) a user can hear, via the spatial audio effect and the further spatial audio effect, that a view is moving away from (iii)(a) the selected item towards (iii)(b) the selected further item, further wherein (iv) in addition to the selected item and the further selected item, other audio segments representing non-selected items of the plurality of items are reproduced simultaneously as well to indicate what other items are available for selection.

2. The method as claimed in claim 1, further comprising: enabling, via a scroll wheel, a user to select the item by rotating a wheel of items.

3. The method as claimed in claim 1, further comprising: enabling, via cursor keys, a user to select the item by navigating through items in a matrix.

4. The method as claimed in claim 3, wherein items along at least one of the dimensions of the matrix are ordered according to an attribute of the items.

5. The method as claimed in claim 1, wherein the visual spatial effect and the spatial audio effect are applied in a three-dimensional space.

6. A non-transitory computer-readable medium embodied with a computer program executable by a programmable device for enabling the programmable device to perform the method of claim 1.

7. A device for enabling selection of an item from a plurality of items, the device comprising electronic circuitry, the electronic circuitry being operative to:
   visually represent a selected item at a center position among visual representations of the plurality of items arranged in one of a three-dimensional wheel and a three-dimensional matrix;
   reproduce at least part of an audio segment representing the selected item;
   apply a visual spatial effect to the visual representation of the selected item; and
   apply a spatial audio effect corresponding to the visual spatial effect to the reproduction of the audio segment, further operative to:
   select a further item instead of the selected item;
   visually represent the selected further item at the center position; and
   reproduce at least part of a further audio segment representing the selected further item upon said selection; and
   apply a further visual spatial effect to the visual representation of the selected further item; and
   apply a further spatial audio effect corresponding to the further visual spatial effect to the reproduction of the further audio segment, wherein (i) both (i)(a) the audio segment and (i)(b) the further audio segment are simultaneously reproduced and (ii) respective corresponding visual spatial effects and spatial audio effects for both (ii)(a) the selected item and (ii)(b) the further selected item are simultaneously applied, during at least a transition period such that (iii) a user can hear, via the spatial audio effect and the further spatial audio effect, that a view is moving away from (iii)(a) the selected item towards (iii)(b) the selected further item, further wherein (iv) in addition to the selected item and the further selected item, other audio segments representing non-selected items of the plurality of items are reproduced simultaneously as well to indicate what other items are available for selection.

* * * * *